(12) United States Patent
Jacobi

(10) Patent No.: US 11,493,227 B2
(45) Date of Patent: Nov. 8, 2022

(54) SWITCHING FLOW WATER SOURCE HEATER CHILLER

(71) Applicant: Robert W. Jacobi, Indianapolis, IN (US)

(72) Inventor: Robert W. Jacobi, Indianapolis, IN (US)

(*) Notice: Subject to any disclaimer, the term of this patent is extended or adjusted under 35 U.S.C. 154(b) by 0 days.

(21) Appl. No.: 17/447,507

(22) Filed: Sep. 13, 2021

(65) Prior Publication Data
US 2021/0404696 A1   Dec. 30, 2021

Related U.S. Application Data

(63) Continuation of application No. PCT/US2021/032052, filed on May 12, 2021.
(Continued)

(51) Int. Cl.
*F24F 11/84* (2018.01)
*F24F 5/00* (2006.01)
*C02F 3/00* (2006.01)
*C02F 3/02* (2006.01)
*F28D 7/16* (2006.01)

(52) U.S. Cl.
CPC .............. *F24F 11/84* (2018.01); *C02F 3/006* (2013.01); *C02F 3/02* (2013.01); *F24F 5/0003* (2013.01); *F24F 5/0046* (2013.01); *F28D 7/16* (2013.01); *C02F 2209/02* (2013.01); *C02F 2303/10* (2013.01); *F24F 2005/0057* (2013.01); *F28F 2270/00* (2013.01)

(58) Field of Classification Search
CPC ........ F24F 11/84; F24F 5/0003; F24F 5/0046; F24F 2005/0057; F25B 2313/002; F25B 2313/004; F25B 2313/0272; F25B 2313/02732; F25B 27/00; F25B 41/20
See application file for complete search history.

(56) References Cited

U.S. PATENT DOCUMENTS 3,760,868 A   9/1973   Cywin
4,375,831 A   3/1983   Downing, Jr.
(Continued)

FOREIGN PATENT DOCUMENTS

JP   2002-310524 A   10/2002
WO   WO 2014/130545 A1   8/2014
WO   WO 2015/066764   5/2015

OTHER PUBLICATIONS

International Search Report and Written Opinion issued in PCT/US2021/032052, dated Aug. 23, 2021, 13 pgs.

*Primary Examiner* — Travis Ruby
(74) *Attorney, Agent, or Firm* — Woodard, Emhardt, Henry, Reeves & Wagner, LLP

(57) ABSTRACT

A switching flow source system includes a switching flow apparatus and a source loop and a production loop that are in fluid communication with the switching flow apparatus. In a cooling mode a first heat exchanger, acting as a condenser, is fluidly connected to the source loop and a second heat exchanger, acting as an evaporator, is fluidly connected to the production loop. The switching flow source system can be switched to a heating mode by operating valves within the switching flow apparatus. In the heating mode the first heat exchanger is switched to being fluidly connected to the production loop while the second heat exchanger is switched to being fluidly connected to the source loop.

20 Claims, 9 Drawing Sheets

Related U.S. Application Data

(60) Provisional application No. 63/023,266, filed on May 12, 2020.

(56) References Cited

U.S. PATENT DOCUMENTS

| | | | |
|---|---|---|---|
| 4,466,256 A | | 8/1984 | MacCracken |
| 4,569,207 A | * | 2/1986 | James .................... F24F 3/001 |
| | | | 62/235.1 |
| 6,412,550 B1 | | 7/2002 | McLaughlin |
| 6,688,129 B2 | | 2/2004 | Ace |
| 8,701,432 B1 | * | 4/2014 | Olson .................. F24F 5/0046 |
| | | | 165/45 |
| 8,815,093 B2 | | 8/2014 | Mahony |
| 9,038,408 B2 | | 5/2015 | Sabo |
| 10,443,909 B2 | | 10/2019 | Wiggs |
| 2006/0242983 A1 | | 11/2006 | Spadafora et al. |
| 2007/0209380 A1 | | 9/2007 | Mueller et al. |
| 2008/0022713 A1 | * | 1/2008 | Jacobi .................. F24F 5/0017 |
| | | | 62/434 |
| 2010/0139886 A1 | | 6/2010 | Desmeules |
| 2010/0236750 A1 | | 9/2010 | Naneff et al. |
| 2010/0236772 A1 | * | 9/2010 | Novotny ............ H05K 7/20836 |
| | | | 165/287 |
| 2012/0255706 A1 | | 10/2012 | Tadayon et al. |
| 2012/0261091 A1 | | 10/2012 | Krecke |
| 2013/0037236 A1 | | 2/2013 | Saunier |
| 2013/0228309 A1 | | 9/2013 | Wood |
| 2014/0048244 A1 | | 2/2014 | Wallace |
| 2014/0284275 A1 | | 9/2014 | Boccato et al. |
| 2015/0013370 A1 | | 1/2015 | Wiggs |
| 2015/0033779 A1 | * | 2/2015 | Seggerman ............. F25B 30/02 |
| | | | 62/426 |
| 2016/0123638 A1 | | 5/2016 | Kimura et al. |
| 2016/0305694 A1 | * | 10/2016 | Leibundgut ............. F24D 15/04 |
| 2017/0198950 A1 | | 7/2017 | Bresson et al. |
| 2017/0328588 A1 | | 11/2017 | Medlock et al. |
| 2018/0142935 A1 | * | 5/2018 | Jacobi .................... F25B 13/00 |
| 2018/0283799 A1 | | 10/2018 | Sakai et al. |
| 2018/0363969 A1 | | 12/2018 | Jacobi |
| 2020/0378633 A1 | * | 12/2020 | Hall ...................... F24F 5/0046 |

* cited by examiner

SWITCHING FLOW WATER SOURCE HEATER CHILLER

CROSS REFERENCE TO RELATED APPLICATIONS

This application is a continuation of International Patent Application No. PCT/US2021/032052 filed May 12, 2021, which claims the benefit of the filing date of Provisional U.S. Patent Application No. 63/023,266, filed on May 12, 2020, both of which are hereby incorporated by reference in their entirety.

BACKGROUND

Heating/cooling systems may be used to provide temperature control to a desired structure or other desired area, for example in an HVAC loop. The heating/cooling system also includes a source loop, mechanical or geothermal, for heat rejection or heat absorption. Some common heating/cooling system use a water source heat pump that employs a reversing flow refrigeration loop to switch from heating to cooling. These water source heat pumps include a heat exchanger that is always connected to the source loop and include another heat exchanger that is always connected to the HVAC loop. When switching between heating and cooling the flow of the refrigerant in the refrigeration loop is reversed and the role of the heat exchangers is switched from acting as a condenser to acting as an evaporator or vice versa. Efficiency is lost when converting the heat exchangers between operational modes. Therefore, there is a need for improvement in this field.

SUMMARY

The present disclosure also provides a switching flow water source heater chiller (SFWSHC) that provides a more efficient water to water heating/cooling compressor based refrigeration cycle that could work over a much greater geothermal loop temperature range versus water source heat pumps (WSHP).

In a typical water cooled HVAC system refrigeration cycle, a compressor boosts the pressure and temperature of a refrigerant that then flows to the condenser heat exchanger where the heat is transferred to a circulating fluid. This is the heat rejection part of the refrigeration cycle that generates a hot water discharge from the water to refrigerant condenser heat exchanger. The refrigerant then flows to and through a pressure reducing control valve where the refrigerant pressure is reduced before entering the evaporator heat exchanger where heat is removed from a second circulating water system. This heat absorption cycle generates cold water. The refrigerant then flows to the compressor where the cycle repeats.

The disclosed SFWSHC uses control valves, sensors, hydronic piping and control logic for these two separate water streams to be "switched" between flow to either the building for HVAC heating or cooling or to a separate geothermal or mechanical equipment system that supplies heat rejection or heat absorption to support space cooling/heating requirements. For example, with a SFWSHC the condenser heat exchanger in the cooling mode the warm (80° F.-130° F.) leaving water flow out of the condenser may be sent to a geothermal or air source fluid cooler (dry or adiabatic) for heat rejection and the cooled fluid is returned to the condenser to repeat the process. In the cooling mode, the evaporator heat exchanger of the SFWSHC absorbs heat from a cool fluid and in the cooling mode chilled water leaving temperature is typically 40° F.-50° F. and is sent to the building to reduce space temperatures with warmer cool water returning to the evaporator to repeat the cycle.

The disclosed SFWSHC may be a two-pipe system operating in either the heating or the cooling mode depending on indoor space temperature requirements. The SFWSHC may be a water to water, single package, hot or chilled water generating unit that includes all valves, sensors, controls and logic to switch the building HVAC water flow from the condenser "high side" for heating duty to the evaporator "low side" for the cooling mode.

Keeping the same condenser "high side" and evaporator "low side" for both the heating and cooling mode provides two significant advantages versus a water to water WSHP. First the condenser and evaporators are optimized for only one range of duty and this can increase SFWSHC efficiency by 10-20% versus a WSHP. Second, with single duty optimized heat exchanger performance, a SFWSHC can operate with a low entering "source" water temperature to the evaporator down to 35° F. in the heating mode while providing condenser leaving heating water temperatures up to 130° F. with a standard refrigerant like R410. In the cooling mode "Source" fluid temperatures up to 120° F. can supply heat rejection for the condenser and allow evaporator leaving chilled water temperatures down to 40° F. supplied to the cooling load.

Preferably, a SFWSHC simultaneously operates with both a warm/hot water flow only from the condenser and a separate simultaneous cool/cold water flow only from the evaporator.

In contrast, a WSHP employs a reversing flow refrigeration loop to switch from heating to cooling. In the cooling mode the hot gas discharged from the compressor flows to the condenser heat exchanger that is connected to the geothermal loop. In a WSHP this cooling mode condenser heat exchanger is connected to the geothermal loop. In the cooling mode, condenser heat is rejected into the geothermal loop.

In the heating mode, a WSHP has valving and additional piping that sends the hot gas from the compressor to what was the cooling mode evaporator heat exchanger, the cooling mode evaporator heat exchanger is connected to the building hydronic HVAC heating/cooling loop. In the heating mode, the cooling mode evaporator heat exchanger is now the heating mode condenser. The heating mode condenser gives up its heat to the hydronic heating loop and provides hot water to heat the structure. In the heating mode, the former cooling mode condenser is now the evaporator and still connected to the geothermal loop and the geothermal loop supplies the heat source that is absorbed by the heating mode evaporator and sent back to the compressor.

A SFWSHC is similar, but fundamentally different than a water to water WSHP. In a SFWSHC the hydronic loop side of both water to refrigerant heat exchangers have valves that switch the "Production" water and "Source" water flow to either the condenser or to the evaporator and the refrigeration circuit flow is fixed to the same condenser and evaporator heat exchanger in both heating and cooling modes. In the cooling mode, the SWFWHC condenser heat exchanger water flow is connected to the geothermal loop to reject heat. In the heating mode, the condenser heat exchanger water flow is connected to the building heating HVAC equipment.

In the cooling mode, the evaporator water flow is connected to the building loop where it sends out cold water to absorb heat from the space to provide space cooling. In the heating mode the evaporator water flow is connected to the geothermal loop where it absorbs heat from the geothermal loop to provide the heat source to the compressor so the condenser can reject heat into the hydronic loop to provide space heating.

Since a SFWSHC is a water to water device, it can also integrate sensible-only "free cooling" from either the geothermal loop or an auxiliary evaporative wet/dry fluid cooler without an operating compressor.

The SFWSHC is also ideally suited to integrate with an optional solar thermal collector and thermal storage tank system that can boost the entering temperature to the SFWSHC evaporator for heating system operation or supply hot water direct to the space heating system without running a compressor "free heating."

The Switching Flow Water Source Heater Chiller (SFWSHC) would preferably use a renewable energy geothermal or solar thermal heat rejection/heat absorption source.

The SFWSHC preferably produces hot/warm water from the refrigerant to water condenser heat exchanger and preferably produces cold/cool water from the refrigerant to water evaporator heat exchanger.

The SFWSHC is optionally a two-pipe system and either supplies hot water for heating or cold water for cooling to satisfy the building or process heating or cooling requirement.

The "Source Water" may be from a geothermal or mechanical source using a geothermal loop or fluid cooler for heat rejection from the condenser in the summer. Similarly, the "Source Water" may be a geothermal loop or a solar thermal or boiler source to supply heat to the heat absorption fluid in the evaporator in the winter or direct to the heating requirement (e.g., radiant heating in the building).

To move between "Production" water and "Source" water for heating or cooling, water control valves switch the flow to either "Production" or "Source."

When "Source Water" flow is switched to the evaporator in the winter for heat absorption, the "Production Source" water flow is switched to the condenser for winter HVAC or process heating requirements.

Preferably, the SFWSHC uses a geothermal source for heat rejection or heat absorption. However, it could also be applied using mechanical components such as a fluid cooler for heat rejection and a solar thermal or boiler for a heat source.

TABLE #1

Geothermal Water Source HVAC Technologies

| Geothermal loop acceptable temperature range | Standard water source heat pump | Extended range water source heat pump | Switching Flow Water Source Heater Chiller |
|---|---|---|---|
| Maximum temperature at inlet for cooling | 90° F. [1] | 100° F. [1] | 120° F. [1] |
| Minimum temperature at inlet for heating | 60° F. [1] | 50° F. [1] | 35° F. [1] [2] |

[1] ±10° F.
[2] May include antifreeze

A switching flow source system, such as a switching flow water source heater chiller, is disclosed. The switching flow source system may be within a housing and may be connectable to various different fluid loops, such as a source loop and/or a production loop. The housing may be designed to enclose the various components of the switching flow source system in a manner so that the housing and the included components have some degree of portability.

The switching flow source system provides an efficient water heating/cooling, compressor-based refrigeration cycle that may be contained within the housing. The refrigeration cycle includes a refrigerant loop that includes a compressor, a first heat exchanger, an expansion valve, and a second heat exchanger. Refrigerant flows from the compressor to the first heat exchanger through a hot gas discharge pipe. The first heat exchanger is in fluid communication with the second heat exchanger through a liquid pipe. The liquid refrigerant discharged from the first heat exchanger flows within liquid pipe and through expansion valve before entering second heat exchanger. Evaporated refrigerant is discharged from second heat exchanger into a suction pipe that extends between second heat exchanger and compressor. The refrigerant is compressed at compressor and the cycle is restarted. A control panel controls the line voltage for the compressor and also may include low voltage wiring to various sensors present in the switching flow source system.

In addition to the refrigerant loop, the switching flow source system may include hydronic loops that provide water (or any other suitable liquid) to exchange heat with the refrigerant running through the first heat exchanger and the second heat exchanger. One of the hydronic loops is a source loop, such as a geothermal loop. However, other possible mechanical sources may also be used, such as a solar thermal or boiler source. The other hydronic loop is a production loop, such as an HVAC loop. The paths of the source loop and the production loop can be modified by the use of valves within the switching flow source system depending on whether heating or cooling is desired as the output of the production loop.

Water from one of the hydronic loops enters the first heat exchanger through a first heat exchanger inlet or a first heat exchanger inlet. The hydronic loop that is connected to the condenser depends on whether the switching flow source system is operating in heating mode or cooling mode. Heat exchange occurs at the first heat exchanger between refrigerant from the refrigerant loop and the water that enters through a first heat exchanger inlet. Heated water then exits from first heat exchanger through a first heat exchanger outlet or a first heat exchanger outlet. Likewise, water from the opposite hydronic loop enters the second heat exchanger through a second heat exchanger inlet, or a second heat exchanger inlet. Heat exchange occurs at the second heat exchanger between refrigerant from the refrigerant loop and the water that enters through second heat exchanger inlet. Cooled water then exits from second heat exchanger through second heat exchanger outlet.

A first heat exchanger control valve may be in fluid communication with the first heat exchanger outlet. In a first, straight through flow condition, the first heat exchanger control valve sends the heated water output from the first heat exchanger outlet to a source supply outlet that is in fluid communication with a source supply line. The source supply outlet connects to the source supply line through a source supply opening defined through the housing. In a second, bypass condition, the first heat exchanger control valve sends the heated water output from the first heat exchanger outlet through a first heat exchanger outlet bypass flow line to a production supply outlet that is in fluid communication with a production supply line.

A second heat exchanger control valve may be in fluid communication with the second heat exchanger outlet. In a first, straight through flow condition, the second heat exchanger control valve sends the cooled water output from the second heat exchanger outlet to the production supply outlet that is in fluid communication with the production supply line. The production supply outlet connects to the production supply line through a production supply opening defined through the housing. In a second, bypass condition, the second heat exchanger control valve sends the cooled water output from the second heat exchanger outlet through an second heat exchanger outlet bypass flow line to the source supply outlet that is in fluid communication with the source supply line.

A first heat exchanger on/off valve may be in fluid communication with the first heat exchanger inlet and a production return inlet through a second heat exchanger bypass line. The HVAC return input may be in fluid communication with a production return line. The production return inlet connects to the production return line through a production return opening defined through the housing. When the condenser on/off valve is in the off condition, fluid from the production return inlet may be sent straight to the second heat exchanger inlet. When the condenser on/off valve is in the on condition, fluid from the production return inlet may be sent through the second heat exchanger bypass line and to the first heat exchanger inlet.

A second heat exchanger on/off valve may be in fluid communication with the second heat exchanger inlet and source return inlet through a first heat exchanger bypass line. The geothermal return input may be in fluid communication with a source return line. The source return line connects to the source return inlet through a source return opening defined through the housing. When the evaporator on/off valve is in the off condition, fluid from the source return inlet may be sent straight to the first heat exchanger inlet. When the evaporator on/off valve is in the on condition, fluid from the source return inlet may be sent through the first heat exchanger bypass line and to the second heat exchanger inlet.

The switching flow source system may also include a domestic hot water loop. The domestic hot water loop diverts the heated water from the first heat exchanger outlet before it reaches the first heat exchanger control valve. The heated water may be sent through a domestic hot water supply line that is in fluid communication with a hot water supply inlet. From the hot water supply inlet the hot water may be directed to a hot water tank. The heated water may then be returned using a water pump to send the water through a hot water return outlet and into a hot water return line. The heated water may then be sent to the first heat exchanger control valve.

The switching flow source system may be arranged to switch between a heating mode and a cooling mode without having to reverse the flow of the refrigerant in the refrigerant loop and without having to the change the operation of the evaporator and the condenser. Therefore, the high pressure portion ("high side") of the refrigeration loop and the low pressure portion ("low side") of the refrigeration loop remains the same regardless of whether the switching flow source system is operating in heating mode or cooling mode.

In the cooling mode, the control valves and the on/off valves are arranged so that the first heat exchanger is part of the source loop and the second heat exchanger is part of the production loop.

In the cooling mode, the first heat exchanger control valve may be arranged in the straight through flow condition so that heated water exiting the first heat exchanger through the first heat exchanger outlet is directed to the source supply outlet and contained within the source loop. The heated water from the first heat exchanger travels through the source loop where it may be cooled by the geothermal source. After traveling through the source loop, the cooled water may be pumped by a water pump through the source return inlet and back to the first heat exchanger to continue the cycle.

The second heat exchanger control valve may be arranged in the straight through flow condition so that cooled water exiting the second heat exchanger through the second heat exchanger outlet is directed to the production supply outlet and into the Production loop. This cooled water can be used for cooling the structure served by the Production loop. Once the cooled water has been used, the water may be pumped through a water pump and returned through the production return inlet 1662 to the second heat exchanger.

In the cooling mode, the first heat exchanger on/off valve and the second heat exchanger on/off valve are both maintained in the off condition. This allows water from the source return inlet to run straight through to the first heat exchanger inlet and into the first heat exchanger. Water from the production return inlet runs to the second heat exchanger inlet and into the second heat exchanger.

In the heating mode, the control valves and the on/off valves are arranged so that the first heat exchanger is part of the production loop and the second heat exchanger is part of the source loop.

In the heating mode, the first heat exchanger control valve may be arranged in the bypass flow condition so that heated water exiting the first heat exchanger through the first heat exchanger outlet is directed through the first heat exchanger outlet bypass flow line and to the Production supply outlet so that the heated water is within the production loop. The heated water from the first heat exchanger travels through the Production loop where it may be used to heat the structure that is served by the Production loop.

After traveling through the production loop, the water may be pumped by a water pump through the production return inlet. In the heating mode, the first heat exchanger on/off valve may be maintained in the on condition, so that the return water from the production loop is sent through the evaporator input bypass line and returned to first heat exchanger through the first heat exchanger inlet.

The second heat exchanger control valve may be arranged in the bypass flow condition in the heating mode so that chilled water exiting the second heat exchanger through the second heat exchanger outlet is directed through the second heat exchanger outlet bypass flow line and to the source supply outlet so that the chilled water is within the source loop. The chilled water from the second heat exchanger travels through the source loop where heat from the geothermal source is transferred to the chilled water to raise the temperature of the chilled water.

After traveling through the source loop, the water may be pumped by a water pump through the source return inlet. In the heating mode, the second heat exchanger on/off valve may be maintained in the on condition, so that the return water from the source loop is sent through the condenser input bypass line and returned to the second heat exchanger through the second heat exchanger inlet.

The source loop may not be a geothermal loop but instead may be a mechanical loop that may include a mechanical equipment source. The switching flow source system operates in the same manner as described above, but instead of using geothermal heat transfer with water output from the first heat exchanger, mechanical heat transfer may be provided.

The switching flow source system may be in a cooling mode. A mechanical loop uses ambient air for heat transfer with the water that runs through the mechanical loop. The mechanical loop may include a fluid cooler that may be dry or could be evaporative. The fluid cooler cools the ambient air either using dry bulb temperature air or cools the ambient air using evaporation to cool the ambient air to a lower, wet bulb temperature when colder water is needed. A storage tank may include captured rainwater that is used as the precooling evaporative source based on an ambient wet bulb temperature. Depending on the surrounding environment, the fluid cooler may provide cold fluid that is 10° F.-30° F. cooler than a standard air cooled fluid cooler.

The mechanical loop may be combined with a solar thermal HVAC loop. The solar thermal HVAC loop may include a solar thermal collector that may include storage capabilities. A solar thermal pump directs liquid to the solar thermal collector. The solar thermal HVAC loop may also optionally include a condensing boiler to add supplemental heat to the liquid that is run through solar thermal HVAC loop. A boiler pump directs liquid to the condensing boiler.

The solar thermal collector and/or the condensing boiler can also be used to heat the structure that is serviced by the solar thermal HVAC loop. In this case, heated water from the solar thermal collector and/or the condensing boiler flows through bypass valve from the Production return line back to the Production supply line. From the HVAC supply line, the heated water is recycled through the HVAC loop.

Heat from the solar thermal collector and/or the condensing boiler may also be used to temper the water in the mechanical loop through the use of interconnecting pipes. Water heated by the solar thermal collector and/or the condensing boiler may be pumped through supply pipe by a supply pipe pump. Water is returned to the HVAC loop through return pipe.

The switching flow source system is capable of working over a much greater geothermal loop temperature range than a comparable water source heat pump. A typical water source heat pump reverses the flow of a refrigeration loop to switch between heating and cooling. When in the cooling mode, hot gas discharged from the compressor flows to the condenser, and the condenser is connected to the geothermal loop. For a water source heat pump, the condenser may always connected to the geothermal loop when in the cooling mode and heat from the condenser is rejected into the geothermal loop.

In a heating mode, the water source heat pump sends hot gas from the compressor to what was the cooling mode evaporator, but has now become the heating mode condenser. The heating mode condenser may always connected to the building hydronic HVAC loop. When in the heating mode, the heating mode condenser creates hot water that is used to heat the building. In the heating mode, the former cooling mode condenser becomes the heating mode evaporator and is connected to the geothermal loop. The geothermal loop supplies the heat source that is absorbed by the heating mode evaporator and sends it back to the compressor.

A method of operating the switching flow source system may include switching from the cooling mode into the heating. In a first step, the switching flow source system may be operated in the cooling mode. In the cooling mode, the source return inlet may be in fluid communication with the first heat exchanger inlet and the source supply outlet in fluid communication with the first heat exchanger outlet. Therefore, the first heat exchanger may be connected to the source loop. Also, in the cooling mode, the production return inlet may be in fluid communication with the second heat exchanger inlet and the production supply outlet in fluid communication with the second heat exchanger outlet. Therefore, in the cooling mode the second heat exchanger may be connected to the production loop.

In a second step, the first heat exchanger on/off valve may be opened and placed in the on position to divert fluid from the production return inlet to the first heat exchanger inlet. In a third step, the second heat exchanger on/off valve may be opened and placed in the on position to divert fluid from the source return inlet to the second heat exchanger inlet.

In a fourth step, the first heat exchanger control valve may be placed in a bypass position so that fluid from the first heat exchanger outlet is directed to the production supply outlet. In a fifth step, the second heat exchanger control valve may be placed in a bypass position so that fluid from the second heat exchanger outlet is directed to the source supply outlet.

By placing the first heat exchanger on/off valve in the on position and placing the first heat exchanger outlet into the bypass position, the first heat exchanger may be switched to being connected with the production loop in the heating mode to being connected to the source loop in the cooling mode. Likewise, by placing the second heat exchanger on/off valve in the on position and placing the second heat exchanger outlet into the bypass position, the second heat exchanger may be switched to being connected with the source loop in the heating mode to being connected to the production loop in the cooling mode.

It should be recognized that the order of the steps may be altered as desired in alternative embodiments. As a nonlimiting example, the fourth step, placing the first heat exchanger control valve into a bypass position, may be performed before third step, opening the second heat exchanger on/off valve. As another example, the third step and fifth step may be performed before the second step and fourth step.

A method of operating the switching flow source system may include switching from the heating mode into the cooling mode. In a first step, the switching flow source system may be operated in the heating mode. In the heating mode, the source return inlet may be in fluid communication with the second heat exchanger inlet and the source supply outlet in fluid communication with the second heat exchanger outlet. Therefore, the second heat exchanger may be connected to the source loop. Also, in the heating mode, the production return inlet may be in fluid communication with the first heat exchanger inlet and the production supply outlet in fluid communication with the first heat exchanger outlet. Therefore, in the heating mode the first heat exchanger may be connected to the production loop.

In a second step, the first heat exchanger on/off valve may be closed and placed in the off position allowing fluid from the production return inlet to be delivered to the second heat exchanger inlet. In a third step, the second heat exchanger on/off valve may be closed and placed in the off position allowing from the source return inlet to be delivered to the first heat exchanger inlet.

In a fourth step, the first heat exchanger control valve may be placed in a pass through position so that the fluid from the first heat exchanger outlet is directed to the source supply outlet. In a fifth step, the second heat exchanger control valve may be placed in a pass through position so that the fluid from the second heat exchanger outlet is directed to the production supply outlet.

By placing the first heat exchanger on/off valve in the off position and placing the first heat exchanger outlet into the pass through position, the first heat exchanger may be switched to being connected with the source loop in the cooling mode as compared to being connected to the production loop in the heating mode. Likewise, by placing the second heat exchanger on/off valve in the off position and placing the second heat exchanger outlet into the pass through position, the second heat exchanger may be switched to being connected with the production loop in the cooling mode as compared to being connected to the source loop in the heating mode.

It should be recognized that the order of the steps may be altered as desired in alternative embodiments. As a nonlimiting example, the fourth step, placing the first heat exchanger control valve into a pass through position, may be performed before the third step, closing the second heat exchanger on/off valve. As another example, the third step and fifth step may be performed before the second step and fourth step.

A hybrid geothermal system may be used to meet several requirements. In one example, when a geothermal loop does not have enough site space available for a 100% capacity horizontal or vertical geothermal loop system, the addition of a mechanical system can help reach that 100% capacity. In another example, the hybrid geothermal system may be used when a heating and cooling system budget does not allow for the expense of a geothermal loop that can supply 100% capacity for heating and cooling. Additionally, a hybrid geothermal system may be used to add heating and/or cooling capacity to an existing geothermal loop that may be running under capacity and needs a boost in heat rejection and/or heat absorption capacity.

The hybrid geothermal system may include a switching flow source system that may include a housing and that operates as described above. The switching flow source system may be fluidly connected to a mechanical geothermal loop, an HVAC loop, and a domestic hot water loop.

In a cooling mode, heated source fluid from the condenser of switching flow source system enters the mechanical geothermal loop through the geothermal supply line and may be pumped to the coils of the mechanical geothermal loop by a geothermal supply pump. In the coils, heat from the heated source fluid may be released to the geothermal source to cool the source fluid.

After exiting the coils, the now cooler source fluid may be directed toward a fluid cooler that may be included on mechanical geothermal loop. The fluid cooler may be in fluid communication with a storage tank. The fluid cooler may be an adiabatic fluid cooler and can be used to add a cool fluid to the source fluid that runs through the mechanical geothermal loop and to further reduce the temperature of the source fluid. In some environments, the fluid cooler can also operate and store additional cold capacity in the geothermal loop for use during the day to create a more efficient daytime heat rejection cycle as additional cold fluid could be added to the source fluid to make up for warmer ground temperatures. After interacting with the fluid cooler, the now cooler source fluid may be returned to the condenser in the switching flow source system through the geothermal return line to repeat the cycle.

A pair of bypass valves allow the flow of the source fluid through the mechanical geothermal loop to be controlled in the cooling mode. A geothermal bypass valve allows the heated fluid to skip running through the coils and to be directed to the fluid cooler. A fluid cooler bypass valve allows the source fluid to bypass the fluid cooler when the cold fluid from the fluid cooler is not needed. This source fluid passes through geothermal bypass valve and may be returned to the condenser in the switching flow source system.

The mechanical geothermal loop also may include condensing boiler and a solar thermal collector. A condensing boiler supply line supplies the condensing boiler with fluid from the geothermal return line. A boiler pump returns fluid from the condensing boiler to the geothermal return line. A solar thermal collector supply line supplies the solar thermal collector with fluid from the geothermal return line. A solar thermal pump returns fluid from the solar thermal collector to the geothermal return line.

Heated fluid from the condensing boiler and the solar thermal collector may also be used to heat fluid in the hot water tank in the domestic hot water loop. A boiler output line leads to a boiler heating coil. Likewise, a thermal collector output line leads to a solar thermal heating coil. The fluid from the boiler output line and the thermal collector output line may be mixed after the boiler heating coil and the thermal heating coil at a domestic hot water supply pipe. The fluid in the domestic hot water supply pipe may be pumped to the hot water tank by a domestic hot water heating coil pump and used to heat water in the hot water tank. After running through the hot water tank, the fluid may be looped back to the solar thermal collector and/or the condensing boiler through a domestic hot water return pipe.

The hybrid geothermal system may include an HVAC loop. The HVAC loop may include an HVAC supply line that receives a production fluid exiting from the switching flow source system. A production water circulating pump pumps water from the HVAC supply line into the coils of the HVAC loop where heat can be transferred to or absorbed from the structure to be heated or cooled by the HVAC loop. The production fluid can be returned to the switching flow source system by an HVAC return line. An HVAC bypass valve allows the production fluid to bypass the coils of the HVAC loop, if desired.

The hybrid geothermal system also may include a hydronic bridge that allows fluid to be transferred between the mechanical geothermal loop and the HVAC loop. The hydronic bridge may include a thermal storage tank and has piping and valving for either hot or cold storage.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
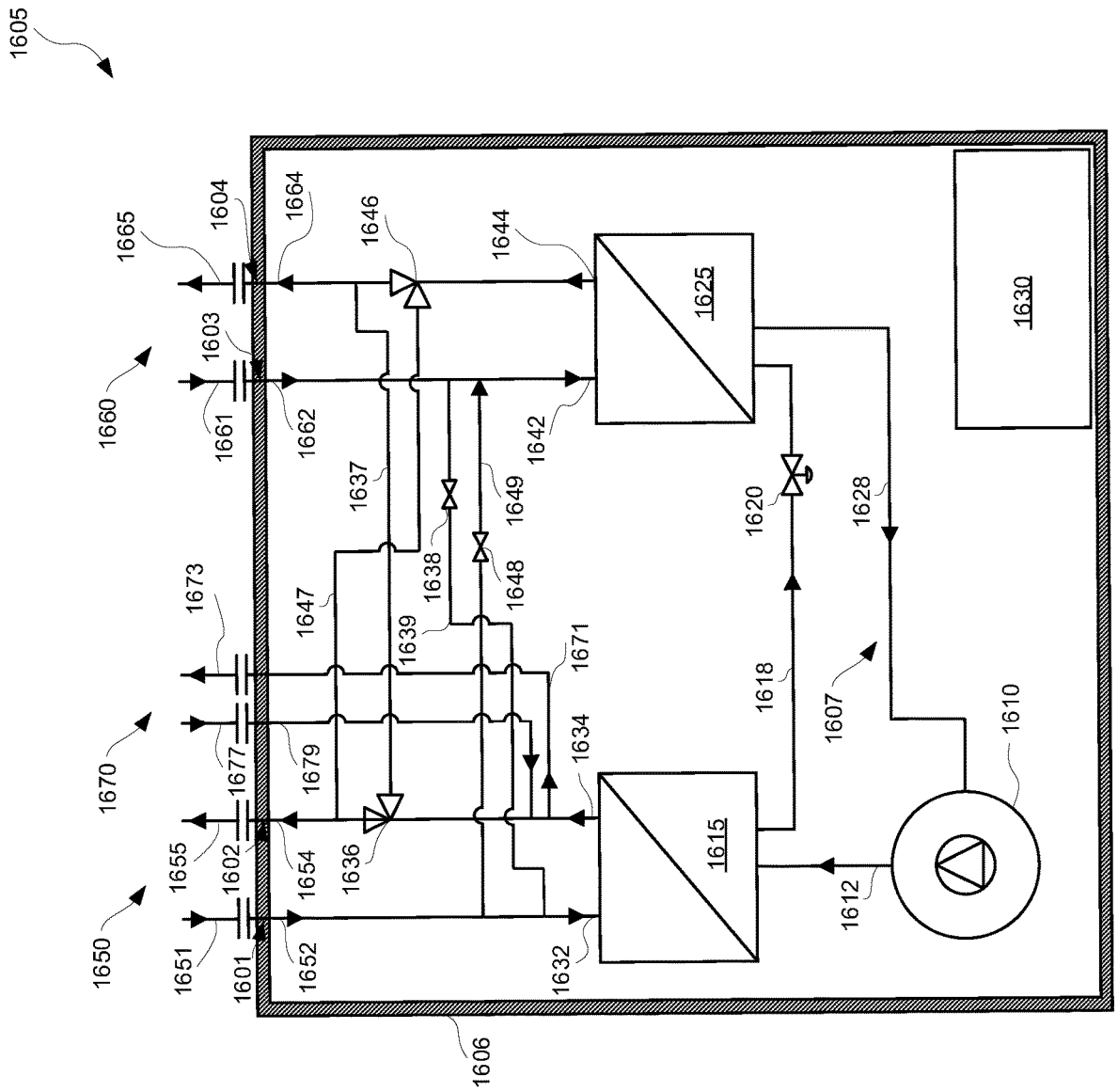
FIG. 1 is a partial schematic view of a switching flow apparatus of switching flow source system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates a switching flow apparatus 1605 of a switching flow source system 1600 (see FIG. 2) also described as a switching flow water source heater chiller. The switching flow source system is within a housing 1606 and, as described below, is connectable to various different fluid loops, such as a source loop and/or a production loop. The housing 1606 is designed to enclose the various components of the switching flow source system 1600 in a manner so that the housing 1606 and the included components have some degree of portability.

The switching flow source system 1600 provides an efficient water heating/cooling, compressor-based refrigeration cycle that is contained within the housing 1606. The refrigeration cycle includes a refrigerant loop 1607 that includes a compressor 1610, a first heat exchanger 1615, represented in this embodiment by a condenser, an expansion valve 1620, and a second heat exchanger 1625, represented in this embodiment by an evaporator. Refrigerant flows from the compressor 1610 to the first heat exchanger 1615 through a hot gas discharge pipe 1612. The first heat exchanger 1615 is in fluid communication with the second heat exchanger 1625 through a liquid pipe 1618. The liquid refrigerant discharged from the first heat exchanger 1615 flows within liquid pipe 1618 and through expansion valve 1620 before entering second heat exchanger 1625. Evaporated refrigerant is discharged from second heat exchanger 1625 into a suction pipe 1628 that extends between second heat exchanger 1625 and compressor 1610. The refrigerant is compressed at compressor 1610 and the cycle is restarted. A control panel 1630 controls the line voltage for the compressor 1610 and also includes low voltage wiring to various sensors present in the switching flow source system 1600.

In addition to the refrigerant loop, the switching flow source system 1600 includes hydronic loops that provide water to exchange heat with the refrigerant running through the first heat exchanger 1615 and the second heat exchanger 1625. One of the hydronic loops is a source loop 1650, and is represented in this embodiment as a geothermal loop (see FIG. 1-2). However, other possible mechanical sources may also be used, such as a solar thermal or boiler source. The other hydronic loop is a production loop 1660, and is represented in this embodiment as an HVAC loop (see FIGS. 1-2). As described below, the paths of the source loop 1650 and the production loop 1660 can be modified by the use of valves within the switching flow source system 1600 depending on whether heating or cooling is desired as the output of the production loop 1660.

Water from one of the hydronic loops enters the first heat exchanger 1615 through a first heat exchanger inlet or a first heat exchanger inlet 1632. The hydronic loop that is connected to the condenser depends on whether the switching flow source system 1600 is operating in heating mode or cooling mode. Heat exchange occurs at the first heat exchanger 1615 between refrigerant from the refrigerant loop and the water that enters through a first heat exchanger inlet 1632. Heated water then exits from first heat exchanger 1615 through a first heat exchanger outlet or a first heat exchanger outlet 1634. Likewise, water from the opposite hydronic loop enters the second heat exchanger 1625 through a second heat exchanger inlet, or a second heat exchanger inlet 1642. Heat exchange occurs at the second heat exchanger 1625 between refrigerant from the refrigerant loop 1607 and the water that enters through second heat exchanger inlet 1642. Cooled water then exits from second heat exchanger 1625 through second heat exchanger outlet 1644.

A first heat exchanger control valve 1636 is in fluid communication with the first heat exchanger outlet 1634. In a first, straight through flow condition, the first heat exchanger control valve 1636 sends the heated water output from the first heat exchanger outlet 1634 to a source supply outlet 1654 that is in fluid communication with a source supply line 1655. The source supply outlet 1654 connects to the source supply line 1655 through a source supply opening 1602 defined through the housing 1606. In a second, bypass condition, the first heat exchanger control valve 1636 sends the heated water output from the first heat exchanger outlet 1634 through a first heat exchanger outlet bypass flow line 1637 to a production supply outlet 1664 that is in fluid communication with a production supply line 1665.

A second heat exchanger control valve 1646 is in fluid communication with the second heat exchanger outlet 1644. In a first, straight through flow condition, the second heat exchanger control valve 1646 sends the cooled water output from the second heat exchanger outlet 1644 to the production supply outlet 1664 that is in fluid communication with the production supply line 1665. The production supply outlet 1664 connects to the production supply line 1665 through a production supply opening 1604 defined through the housing 1606. In a second, bypass condition, the second heat exchanger control valve 1646 sends the cooled water output from the second heat exchanger outlet 1644 through a second heat exchanger outlet bypass flow line 1647 to the source supply outlet 1654 that is in fluid communication with the source supply line 1655. A first heat exchanger on/off valve 1638 is in fluid communication with the first heat exchanger inlet 1632 and a production return inlet 1662 through a second heat exchanger bypass line 1639. The production return inlet 1662 is in fluid communication with a production return line 1661. The production return inlet 1662 connects to the production return line 1661 through a production return opening 1603 defined through the housing 1606. When the first heat exchanger on/off valve 1638 is in the off condition, fluid from the production return inlet 1662 is sent straight to the second heat exchanger inlet 1642. When the first heat exchanger on/off valve 1638 is in the on condition, fluid from the production return inlet 1662 is sent through the second heat exchanger bypass line 1639 and to the first heat exchanger inlet 1632.

A second heat exchanger on/off valve 1648 is in fluid communication with the second heat exchanger inlet 1642 and source return inlet 1652 through a first heat exchanger bypass line 1649. The source return inlet 1652 is in fluid communication with a source return line 1651. The source return line 1651 connects to the source return inlet 1652 through a source return opening 1601 defined through the housing 1606. When the second heat exchanger on/off valve 1648 is in the off condition, fluid from the source return inlet 1652 is sent straight to the first heat exchanger inlet 1632. When the second heat exchanger on/off valve 1648 is in the on condition, fluid from the source return inlet 1652 is sent through the first heat exchanger bypass line 1649 and to the second heat exchanger inlet 1642.

In some embodiments, the switching flow source system 1600 may also include a domestic hot water loop 1670. The domestic hot water loop 1670 diverts the heated water from the first heat exchanger outlet 1634 before it reaches the first heat exchanger control valve 1636. The heated water is sent through a domestic hot water supply line 1671 that is in fluid communication with a hot water supply inlet 1673. From the hot water supply inlet 1673 the hot water is directed to a hot water tank 1675 (see FIG. 2). The heated water is then returned using a water pump 1676 to send the water through a hot water return outlet 1677 and into a hot water return line 1679. The heated water is then sent to the first heat exchanger control valve 1636.

The switching flow source system 1600 is arranged so that it may be switched between a heating mode and a cooling mode without having to reverse the flow of the refrigerant in the refrigerant loop and without having to the change the operation of the evaporator and the condenser. Therefore, the high pressure portion ("high side") of the refrigeration loop and the low pressure portion ("low side") of the refrigeration loop remains the same regardless of whether the switching flow source system 1600 is operating in heating mode or cooling mode.

Figure 2:
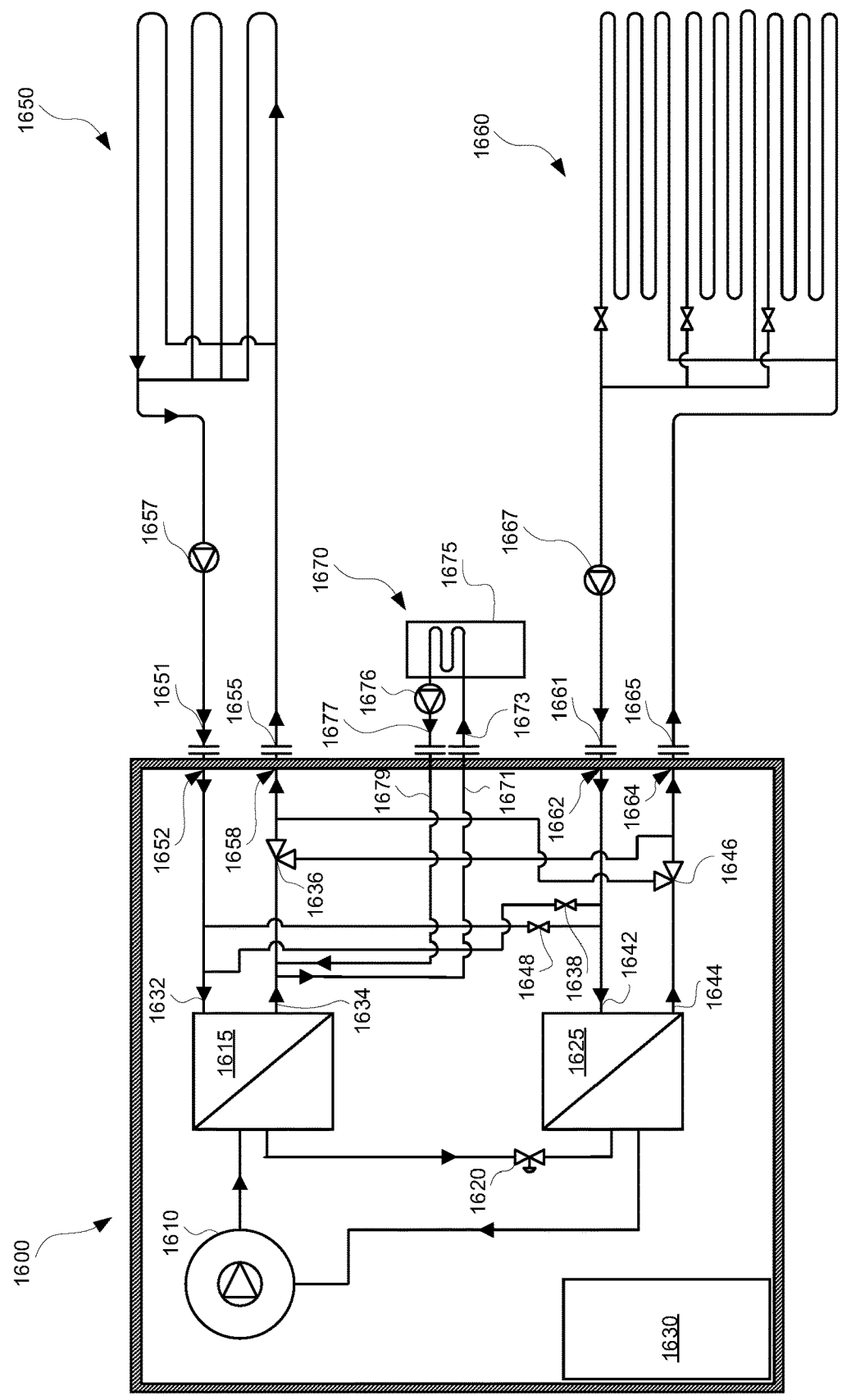
FIG. 2 is a schematic view of the switching flow source system arranged in a cooling mode.

The switching flow source system 1600 in a cooling mode is illustrated in FIG. 2. In the cooling mode, the control valves 1636, 146 and the on/off valves 1638, 1648 are arranged so that the first heat exchanger 1615 is part of the source loop 1650 and the second heat exchanger 1625 is part of the production loop 1660.

In the cooling mode, the first heat exchanger control valve 1636 is arranged in the straight through flow condition so that heated water exiting the first heat exchanger 1615 through the first heat exchanger outlet 1634 is directed to the source supply outlet 1654 and contained within the source loop 1650. The heated water from the first heat exchanger 1615 travels through the source loop 1650 where it is cooled by the geothermal source. After traveling through the source loop 1650, the cooled water is pumped by a water pump 1657 through the source return inlet 1652 and back to the first heat exchanger 1615 to continue the cycle.

The second heat exchanger control valve 1646 is also arranged in the straight through flow condition so that cooled water exiting the second heat exchanger 1625 through the second heat exchanger outlet 1644 is directed to the production supply outlet 1664 and into the production loop 1660. This cooled water can be used for cooling the structure served by the production loop 1660. Once the cooled water has been used, the water is pumped through a water pump 1667 and returned through the production return inlet 1662 to the second heat exchanger 1625.

In the cooling mode, the first heat exchanger on/off valve 1638 and the second heat exchanger on/off valve 1648 are both maintained in the off condition. This allows water from the source return inlet 1652 to run straight through to the first heat exchanger inlet 1632 and into the first heat exchanger 1615. Water from the production return inlet 1662 runs to the second heat exchanger inlet 1642 and into the second heat exchanger 1625.

Figure 3:
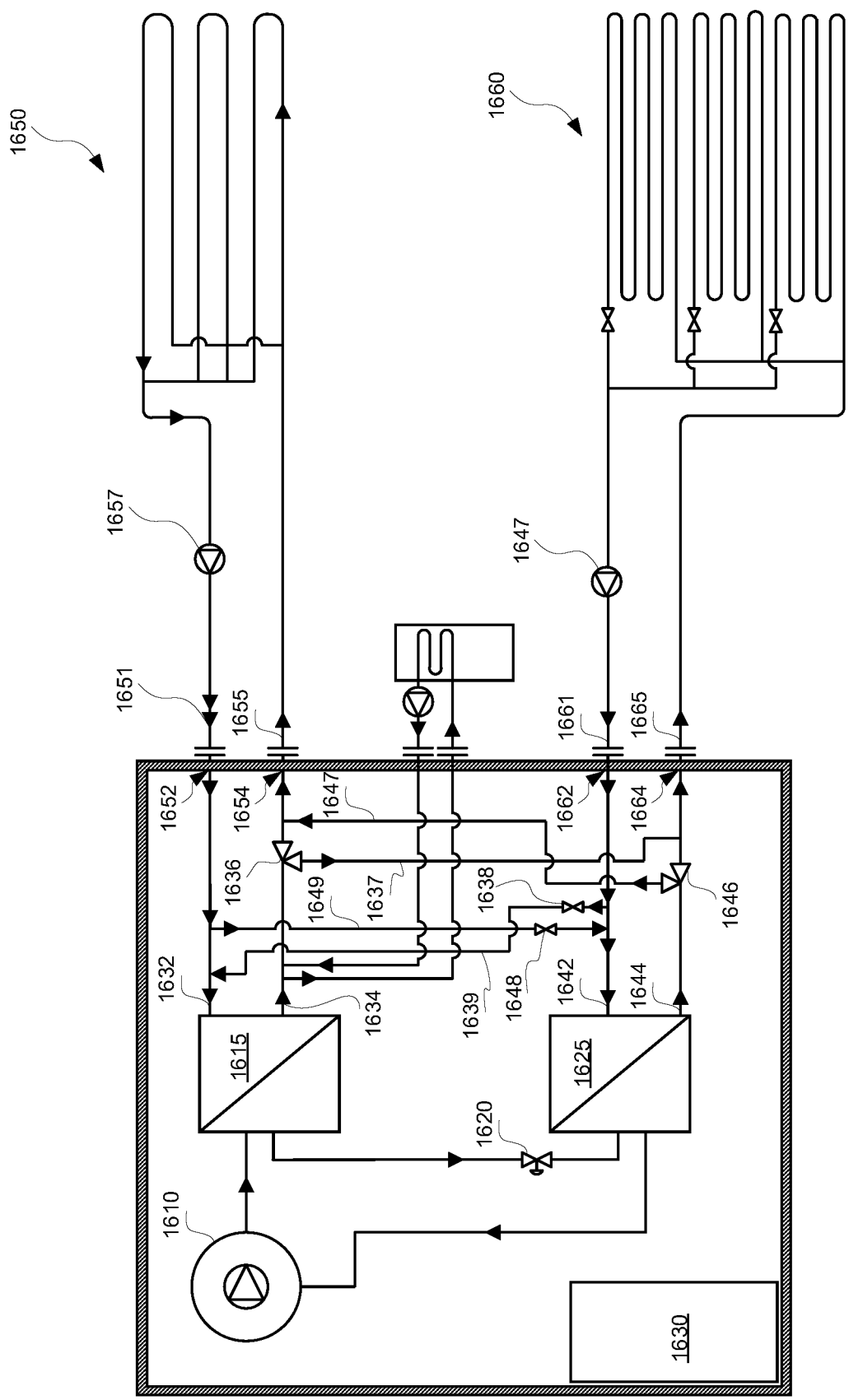
FIG. 3 is a schematic view of the switching flow source system of FIG. 2 arranged in a heating mode.

The switching flow source system 1600 in a heating mode is illustrated in FIG. 3. In the heating mode, the control valves 1636, 146 and the on/off valves 1638, 1648 are arranged so that the first heat exchanger 1615 is part of the production loop 1660 and the second heat exchanger 1625 is part of the source loop 1650.

In the heating mode, the first heat exchanger control valve 1636 is arranged in the bypass flow condition so that heated water exiting the first heat exchanger 1615 through the first heat exchanger outlet 1634 is directed through the first heat exchanger outlet bypass flow line 1637 and to the production supply outlet 1664 so that the heated water is within the production loop 1660. The heated water from the first heat exchanger 1615 travels through the Production loop 1660 where it is used to heat the structure that is served by the production loop 1660.

After traveling through the production loop 1660, the water is pumped by a water pump 1667 through the production return inlet 1662. In the heating mode, the first heat exchanger on/off valve 1638 is maintained in the on condition, so that the return water from the production loop 1660 is sent through the second heat exchanger bypass line 1639 and returned to first heat exchanger 1615 through the first heat exchanger inlet 1632.

The second heat exchanger control valve 1646 is also arranged in the bypass flow condition in the heating mode so that chilled water exiting the second heat exchanger 1625 through the second heat exchanger outlet 1644 is directed through the second heat exchanger outlet bypass flow line 1647 and to the source supply outlet 1654 so that the chilled water is within the source loop 1650. The chilled water from the second heat exchanger 1625 travels through the source loop 1650 where heat from the geothermal source is transferred to the chilled water to raise the temperature of the chilled water.

After traveling through the source loop 1650, the water is pumped by a water pump 1657 through the source return inlet 1652. In the heating mode, the second heat exchanger on/off valve 1648 is maintained in the on condition, so that the return water from the source loop 1650 is sent through the first heat exchanger bypass line 1649 and returned to the second heat exchanger 1625 through the second heat exchanger inlet 1642.

Figure 4:
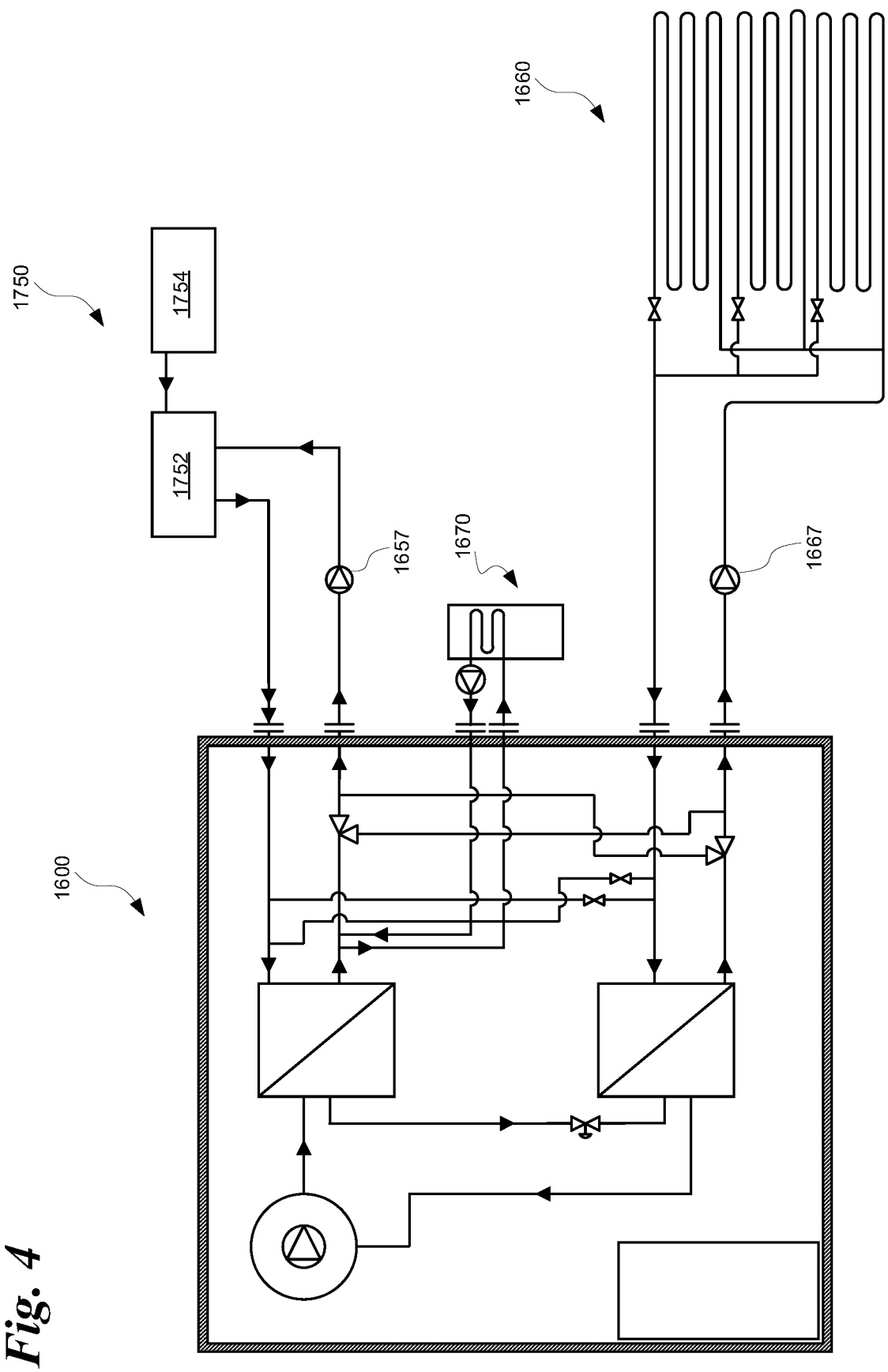
FIG. 4 is a schematic view of the switching flow source system of FIG. 2 including a mechanical source.

In an alternative embodiment, shown in FIG. 4, the source loop is not a geothermal loop but instead is a mechanical loop 1750 that includes a mechanical equipment source. The switching flow source system 1600 operates in the same manner as described above, but instead of using geothermal heat transfer with water output from the first heat exchanger 1615, mechanical heat transfer is provided.

In the example shown, the switching flow source system 1600 is in a cooling mode. A mechanical loop 1750 uses ambient air for heat transfer with the water that runs through the mechanical loop 1750. The mechanical loop 1750 includes a fluid cooler 1752 that may be dry or could be evaporative. The fluid cooler 1752 cools the ambient air either using dry bulb temperature air or cools the ambient air using evaporation to cool the ambient air to a lower, wet bulb temperature when colder water is needed. In FIG. 4, a storage tank 1754 includes captured rainwater that is used as the precooling evaporative source based on an ambient wet bulb temperature. Depending on the surrounding environment, the fluid cooler 1752 may provide cold fluid that is 10° F.-30° F. cooler than a standard air cooled fluid cooler.

Figure 5:
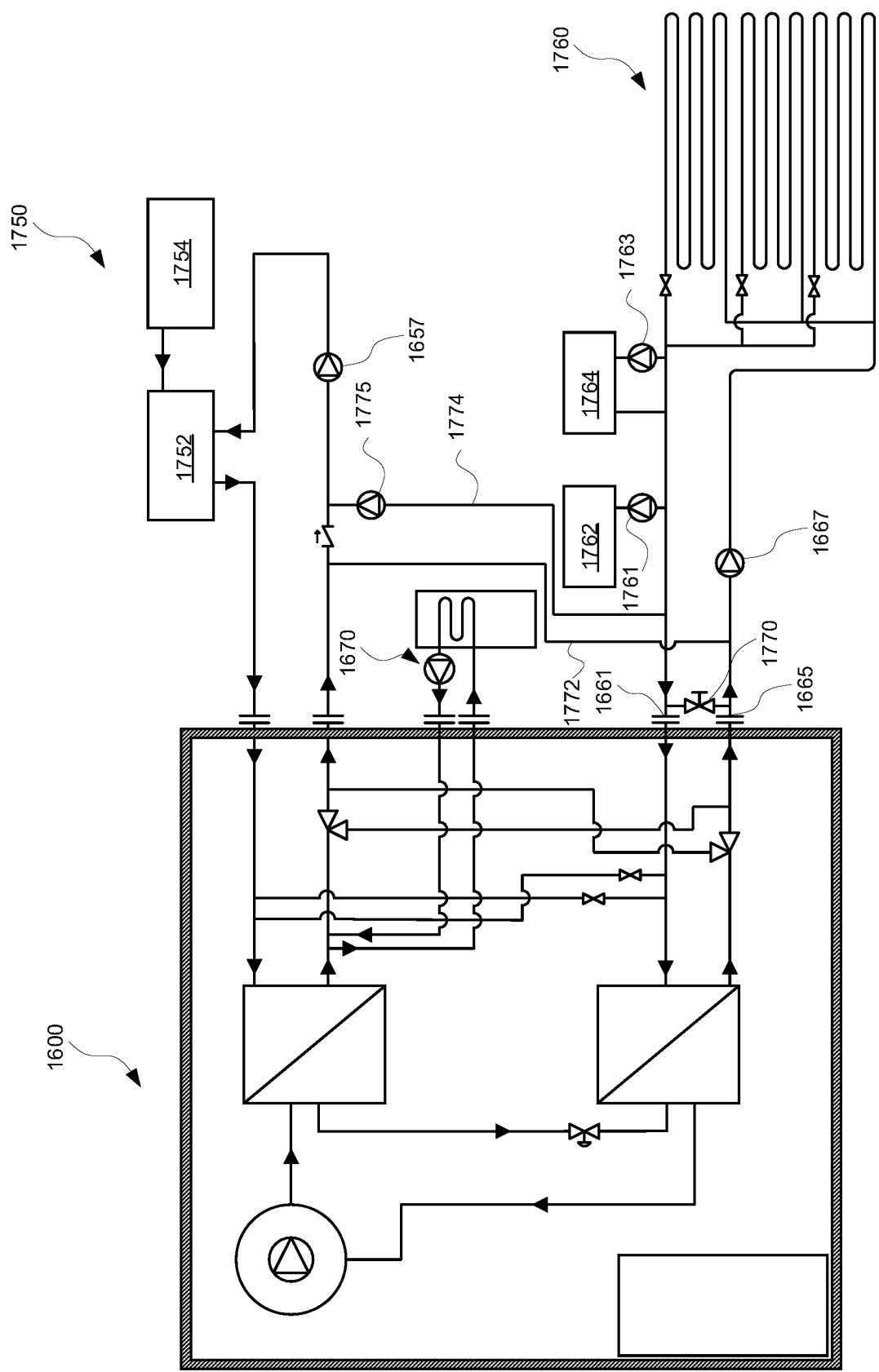
FIG. 5 is a schematic view of the switching flow source system of FIG. 2 including a mechanical source and a boiler heating backup.

In another embodiment, illustrated in FIG. 5, the mechanical loop 1750 shown in FIG. 4 is combined with a solar thermal HVAC loop 1760. The embodiment shown in FIG. 5 illustrates a heating mode. The solar thermal HVAC loop 1760 includes a solar thermal collector 1764 that includes storage capabilities. A solar thermal pump 1763 directs liquid to the solar thermal collector 1764. The solar thermal HVAC loop 1760 may also optionally include a condensing boiler 1762 to add supplemental heat to the liquid that is run through solar thermal HVAC loop 1760. A boiler pump 1761 directs liquid to the condensing boiler 1762.

The solar thermal collector 1764 and/or the condensing boiler 1762 can also be used to heat the structure that is serviced by the solar thermal HVAC loop 1760. In this case, heated water from the solar thermal collector 1764 and/or the condensing boiler 1762 flows through bypass valve 1770 from the production return line 1661 back to the production supply line 1665. From the HVAC supply line, the heated water is recycled through the HVAC loop 1760.

Heat from the solar thermal collector 1764 and/or the condensing boiler 1762 may also be used to temper the water in the mechanical loop 1750 through the use of interconnecting pipes 1772, 1774. Water heated by the solar thermal collector 1764 and/or the condensing boiler 1762 is pumped through supply pipe 1774 by a supply pipe pump 1775. Water is returned to the HVAC loop 1760 through return pipe 1772.

The switching flow source system 1600 is capable of working over a much greater geothermal loop temperature range than a comparable water source heat pump. A typical water source heat pump reverses the flow of a refrigeration loop to switch between heating and cooling. When in the cooling mode, hot gas discharged from the compressor flows to the condenser, and the condenser is connected to the geothermal loop. For a water source heat pump, the condenser is always connected to the geothermal loop when in the cooling mode and heat from the condenser is rejected into the geothermal loop.

In a heating mode, the water source heat pump sends hot gas from the compressor to what was the cooling mode evaporator, but has now become the heating mode condenser. The heating mode condenser is always connected to the building hydronic HVAC loop. When in the heating mode, the heating mode condenser creates hot water that is used to heat the building. In the heating mode, the former cooling mode condenser becomes the heating mode evaporator and is connected to the geothermal loop. The geothermal loop supplies the heat source that is absorbed by the heating mode evaporator and sends it back to the compressor.

Figure 6:
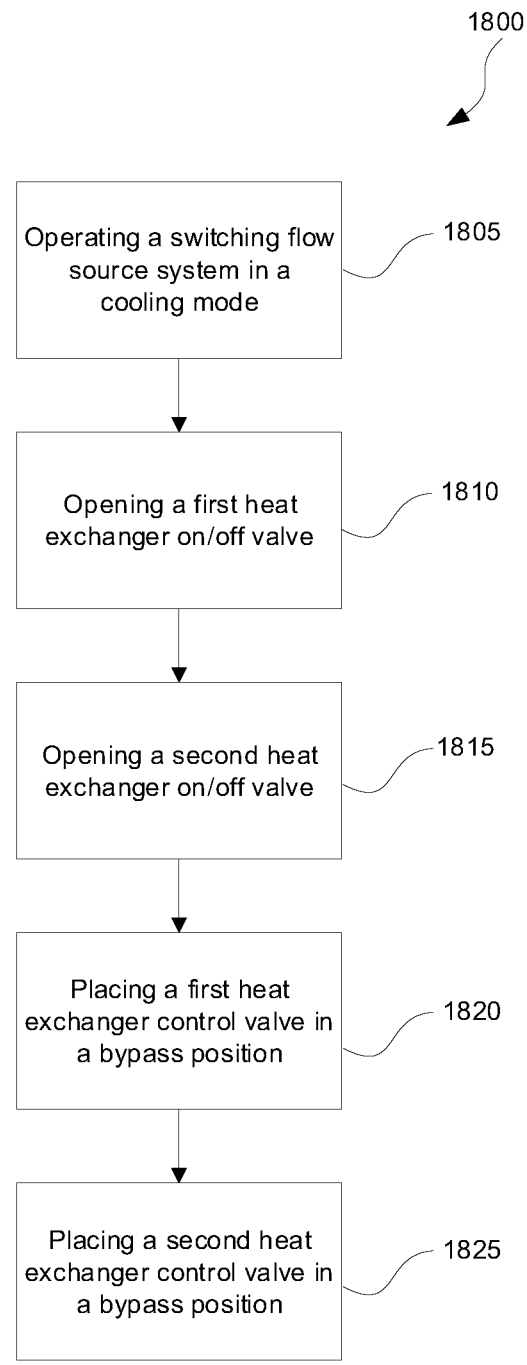
FIG. 6 is a flowchart illustrating a method of switching the switching flow source system from a cooling mode to a heating mode.

A method of switching the switching flow source system 1600 from the cooling mode into the heating mode is illustrated in flowchart 1800, shown in FIG. 6. In a first step 1805, the switching flow source system 1600 is operated in the cooling mode. In the cooling mode, the source return inlet 1652 is in fluid communication with the first heat exchanger inlet 1632 and the source supply outlet 1654 is in fluid communication with the first heat exchanger outlet 1634. Therefore, the first heat exchanger 1615 is connected to the source loop 1650. Also, in the cooling mode, the production return inlet 1662 is in fluid communication with the second heat exchanger inlet 1642 and the production supply outlet 1664 is in fluid communication with the second heat exchanger outlet 1644. Therefore, in the cooling mode the second heat exchanger 1625 is connected to the production loop 1660.

In a second step 1810, the first heat exchanger on/off valve 1638 is opened and placed in the on position to divert fluid from the production return inlet 1662 to the first heat exchanger inlet 1632. In a third step 1815, the second heat exchanger on/off valve 1648 is opened and placed in the on position to divert fluid from the source return inlet 1652 to the second heat exchanger inlet 1642.

In a fourth step 1820, the first heat exchanger control valve 1636 is placed in a bypass position so that the fluid from the first heat exchanger outlet 1634 is directed to the production supply outlet 1664. In a fifth step 1825, the second heat exchanger control valve 1646 is placed in a bypass position so that the fluid from the second heat exchanger outlet 1644 is directed to the source supply outlet 1654.

By placing the first heat exchanger on/off valve 1638 in the on position and placing the first heat exchanger outlet 1634 into the bypass position, the first heat exchanger 1615 is switched to being connected with the production loop 1660 in the heating mode to being connected to the source loop 1650 in the cooling mode. Likewise, by placing the second heat exchanger on/off valve 1648 in the on position and placing the second heat exchanger outlet 1644 into the bypass position, the second heat exchanger 1625 is switched to being connected with the source loop 1650 in the heating mode to being connected to the production loop 1660 in the cooling mode.

It should be recognized that the order of the steps 1810, 1815, 1820, 1825 may be altered as desired in alternative embodiments. As a nonlimiting example, the fourth step 1820, placing the first heat exchanger control valve 1636 into a bypass position, may be performed before third step 1815, opening the second heat exchanger on/off valve 1648. As another example, the third step 1815 and fifth step 1825 may be performed before the second step 1810 and fourth step 1820.

Figure 7:
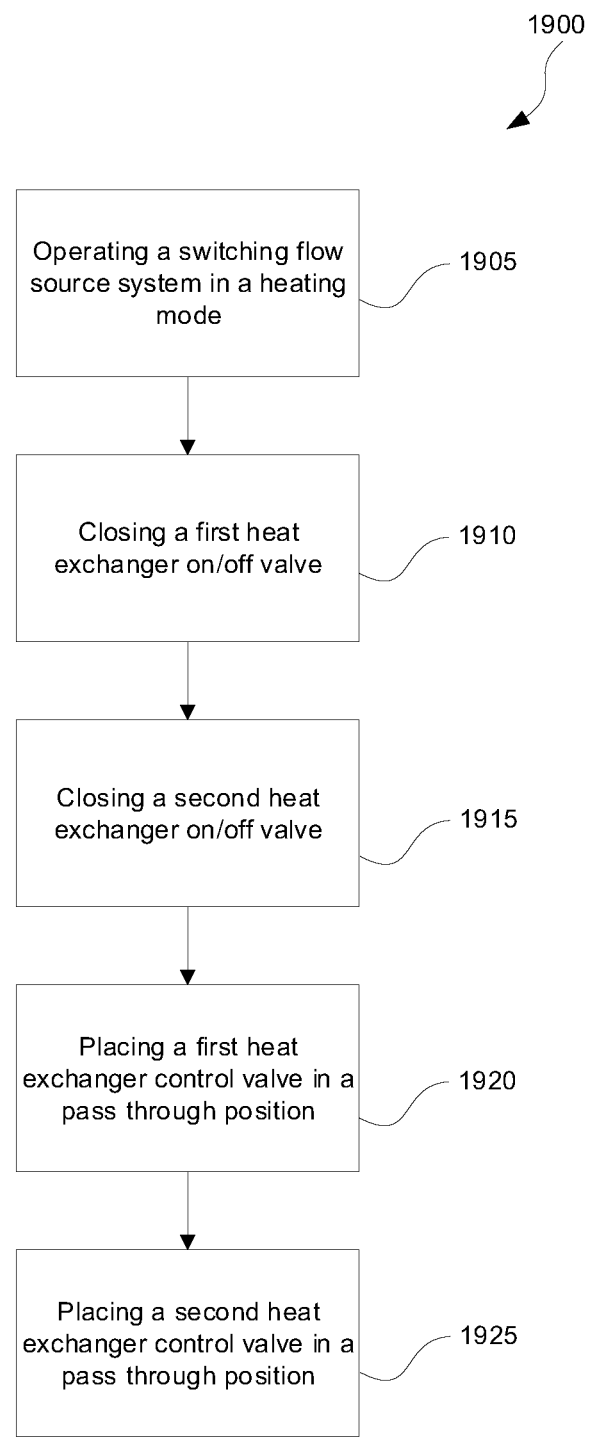
FIG. 7 is a flowchart illustrating a method of switching the switching flow source system from a heating mode to a cooling mode.

A method of switching the switching flow source system 1600 from the heating mode into the cooling mode is illustrated in flowchart 1900, shown in FIG. 7. In a first step 1905, the switching flow source system 1600 is operated in the heating mode. In the heating mode, the source return inlet 1652 is in fluid communication with the second heat exchanger inlet 1642 and the source supply outlet 1654 is in fluid communication with the second heat exchanger outlet 1644. Therefore, the second heat exchanger 1625 is connected to the source loop 1650. Also, in the heating mode, the production return inlet 1662 is in fluid communication with the first heat exchanger inlet 1632 and the production supply outlet 1664 is in fluid communication with the first heat exchanger outlet 1634. Therefore, in the heating mode the first heat exchanger 1615 is connected to the production loop 1660.

In a second step 1910, the first heat exchanger on/off valve 1638 is closed and placed in the off position allowing fluid from the production return inlet 1662 to be delivered to the second heat exchanger inlet 1642. In a third step 1915, the second heat exchanger on/off valve 1648 is closed and placed in the off position allowing from the source return inlet 1652 to be delivered to the first heat exchanger inlet 1632.

In a fourth step 1920, the first heat exchanger control valve 1636 is placed in a pass through position so that the fluid from the first heat exchanger outlet 1634 is directed to the source supply outlet 1654. In a fifth step 1925, the second heat exchanger control valve 1646 is placed in a pass through position so that the fluid from the second heat exchanger outlet 1644 is directed to the production supply outlet 1664.

By placing the first heat exchanger on/off valve 1638 in the off position and placing the first heat exchanger outlet 1634 into the pass through position, the first heat exchanger 1615 is switched to being connected with the source loop in the cooling mode as compared to being connected to the production loop in the heating mode. Likewise, by placing the second heat exchanger on/off valve 1648 in the off position and placing the second heat exchanger outlet 1644 into the pass through position, the second heat exchanger 1625 is switched to being connected with the production loop 1660 in the cooling mode as compared to being connected to the source loop 1650 in the heating mode.

It should be recognized that the order of the steps 1910, 1915, 1920, 1925 may be altered as desired in alternative embodiments. As a nonlimiting example, the fourth step 1920, placing the first heat exchanger control valve 1636 into a pass through position, may be performed before the third step 1915, closing the second heat exchanger on/off valve 1648. As another example, the third step 1915 and fifth step 1925 may be performed before the second step 1910 and fourth step 1920.

Figure 8:
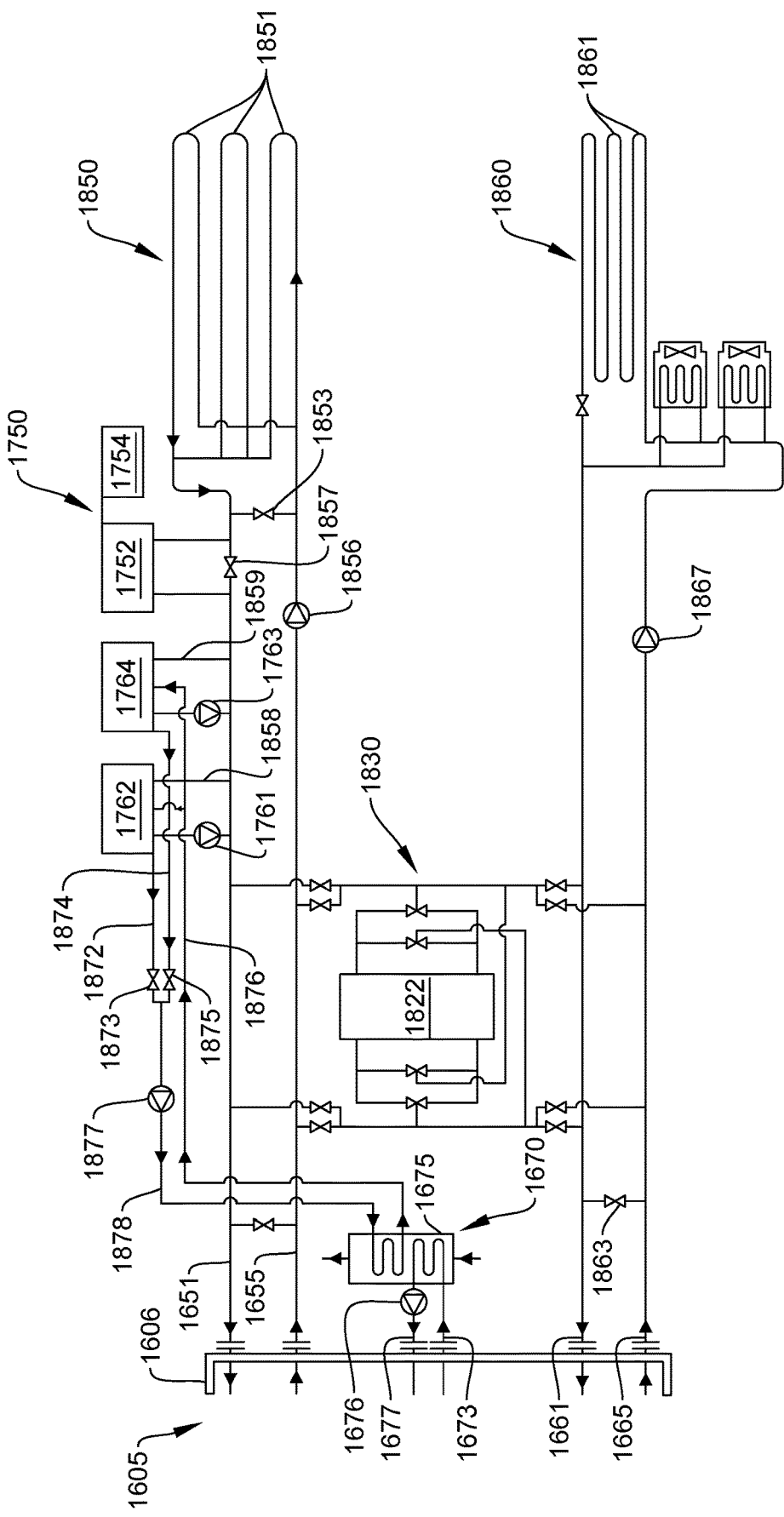
FIG. 8 is a schematic view of a hybrid geothermal system.

FIG. 8 is a hybrid geothermal system 1800 including both mechanical and geothermal systems. The hybrid geothermal system 1800 may be used to meet several requirements. In one example, when a geothermal loop does not have enough site space available for a 100% capacity horizontal or vertical geothermal loop system, the addition of a mechanical system can help reach that 100% capacity. In another example, the hybrid geothermal system 1800 may be used when a heating and cooling system budget does not allow for the expense of a geothermal loop that can supply 100% capacity for heating and cooling. Additionally, a hybrid geothermal system 1800 may be used to add heating and/or cooling capacity to an existing geothermal loop that is running under capacity and needs a boost in heat rejection and/or heat absorption capacity.

The hybrid geothermal system 1800 includes a switching flow source system 1600 that includes a housing 1605 as shown in FIG. 1 and that operates as described above. The switching flow source system 1600 is fluidly connected to a mechanical geothermal loop 1850, an HVAC loop 1860, and a domestic hot water loop 1670.

In a cooling mode, heated source fluid from the condenser of switching flow source system 1600 enters the mechanical geothermal loop 1850 through the geothermal supply line 1655 and is pumped to the coils 1851 of the mechanical geothermal loop 1850 by a geothermal supply pump 1856. In the coils 1851, heat from the heated source fluid is released to the geothermal source to cool the source fluid.

After exiting the coils 1851, the now cooler source fluid is directed toward a fluid cooler 1752 that is included on mechanical geothermal loop 1850. The fluid cooler 1752 is in fluid communication with a storage tank 1754. In some embodiments, the fluid cooler 1752 is an adiabatic fluid cooler and can be used to add a cool fluid to the source fluid that runs through the mechanical geothermal loop 1850 and to further reduce the temperature of the source fluid. In some environments, the fluid cooler 1752 can also operate and store additional cold capacity in the geothermal loop for use during the day to create a more efficient daytime heat rejection cycle as additional cold fluid could be added to the source fluid to make up for warmer ground temperatures. After interacting with the fluid cooler 1752, the now cooler source fluid may be returned to the condenser in the switching flow source system 1600 through the geothermal return line 1651 to repeat the cycle.

A pair of bypass valves allow the flow of the source fluid through the mechanical geothermal loop 1850 to be controlled in the cooling mode. A geothermal bypass valve 1853 allows the heated fluid to skip running through the coils 1851 and to be directed to the fluid cooler 1752. A fluid cooler bypass valve 1857 allows the source fluid to bypass the fluid cooler 1752 when the cold fluid from the fluid cooler 1752 is not needed. This source fluid passes through geothermal bypass valve 1853 and is returned to the condenser in the switching flow source system 1600.

The mechanical geothermal loop 1850 also includes condensing boiler 1762 and a solar thermal collector 1764. A condensing boiler supply line 1862 supplies the condensing boiler 1762 with fluid from the geothermal return line 1651. A boiler pump 1761 returns fluid from the condensing boiler 1762 to the geothermal return line 1651. A solar thermal collector supply line 1864 supplies the solar thermal collector 1764 with fluid from the geothermal return line 1651. A solar thermal pump 1763 returns fluid from the solar thermal collector 1764 to the geothermal return line 1651.

Heated fluid from the condensing boiler 1762 and the solar thermal collector 1764 may also be used to heat fluid in the hot water tank 1675 in the domestic hot water loop 1670. A boiler output line 1872 leads to a boiler heating coil 1873. Likewise, a thermal collector output line 1874 leads to a solar thermal heating coil 1875. The fluid from the boiler output line 1872 and the thermal collector output line 1874 is mixed after the boiler heating coil 1873 and the thermal heating coil 1875 at a domestic hot water supply pipe 1878. The fluid in the domestic hot water supply pipe 1878 is pumped to the hot water tank 1675 by a domestic hot water heating coil pump 1877 and used to heat water in the hot water tank 1675. After running through the hot water tank 1675, the fluid is looped back to the solar thermal collector 1764 and/or the condensing boiler 1762 through a domestic hot water return pipe 1876.

The hybrid geothermal system 1800 includes an HVAC loop 1860. The HVAC loop includes an HVAC supply line 1665 that receives a production fluid exiting from the switching flow source system 1600. A production water circulating pump 1867 pumps water from the HVAC supply line 1665 into the coils 1861 of the HVAC loop 1860 where heat can be transferred to or absorbed from the structure to be heated or cooled by the HVAC loop 1860. The production fluid can be returned to the switching flow source system 1600 by an HVAC return line 1661. An HVAC bypass valve allows the production fluid to bypass the coils 1861 of the HVAC loop 1860, if desired.

Figure 9:
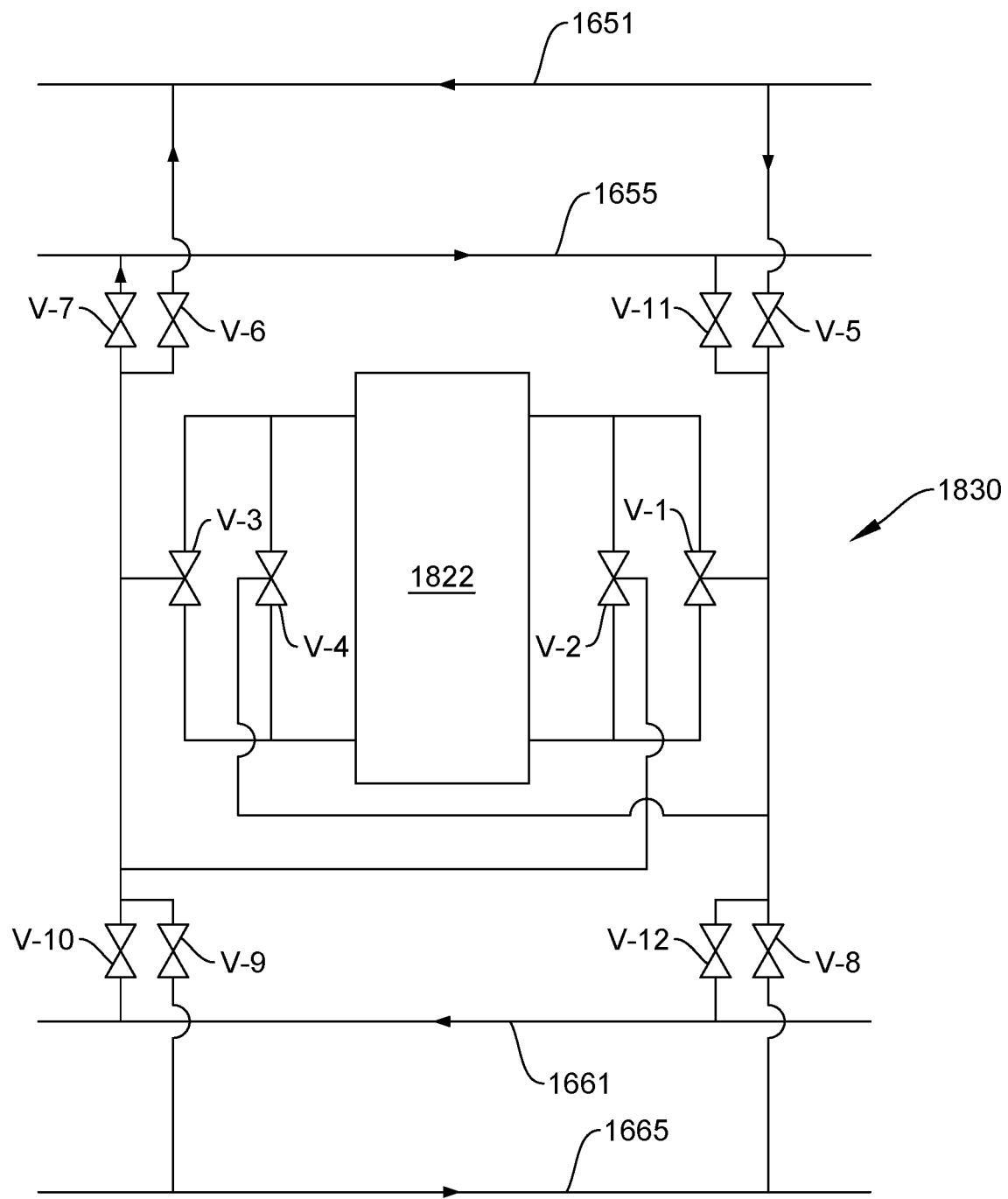
FIG. 9 is a schematic view of a hydronic bridge for the hybrid geothermal system of FIG. 8.

The hybrid geothermal system 1800 also includes a hydronic bridge 1830 (see FIG. 9) that allows fluid to be transferred between the mechanical geothermal loop 1850 and the HVAC loop. The hydronic bridge 1830 includes a thermal storage tank 1822 and has piping and valving for either hot or cold storage. The hydronic bridge 1830 includes a series of valves V-1-V-12.

The following numbered clauses set out specific embodiments that may be useful in understanding the present invention:

1. A switching flow apparatus comprising:
   a housing;
   a refrigerant loop within said housing, wherein said refrigerant loop includes a compressor, a first heat exchanger, an expansion valve, and a second heat exchanger;

a first heat exchanger inlet for fluid entering the first heat exchanger and a first heat exchanger outlet for fluid exiting the first heat exchanger;

a second heat exchanger inlet for fluid entering the second heat exchanger and a second heat exchanger outlet for fluid exiting the second heat exchanger;

a source return inlet configured to be in fluid communication with a source return line exterior to said housing, and a source supply outlet configured to be in fluid communication with a source supply line exterior to said housing;

a production return inlet configured to be in fluid communication with a production return line exterior to said housing, and a production supply outlet configured to be in fluid communication with a production supply line exterior to said housing;

wherein in a cooling mode, said source return inlet is in fluid communication with said first heat exchanger inlet and said source supply outlet is in fluid communication with said first heat exchanger outlet, and wherein said production return inlet is in fluid communication with said second heat exchanger inlet and said production supply outlet is in fluid communication with said second heat exchanger outlet; and wherein in a heating mode, said production return inlet is in fluid communication with said first heat exchanger inlet and said production supply outlet is in fluid communication with said first heat exchanger outlet, and wherein said source return inlet is in fluid communication with said second heat exchanger inlet and said source supply outlet is in fluid communication with said second heat exchanger outlet.

2. The switching flow apparatus of clause 1, wherein said first heat exchanger is used for heating the source fluid in the cooling mode and heating the production fluid in the heating mode.

3. The switching flow apparatus of any preceding clause, wherein said first heat exchanger is a condenser.

4. The switching flow apparatus of any preceding clause, wherein said second heat exchanger is used for cooling the production fluid in the cooling mode and cooling the source fluid in the heating mode.

5. The switching flow apparatus of any preceding clause, wherein said second heat exchanger is an evaporator.

6. The switching flow apparatus of any preceding clause, further comprising:

a first heat exchanger control valve in fluid communication with said first heat exchanger outlet, wherein said first heat exchanger control valve is within said housing;

wherein said first heat exchanger control valve is configured to direct fluid from the first heat exchanger outlet to the source supply outlet in the cooling mode; and wherein said first heat exchanger control valve is configured to direct fluid from the first heat exchanger outlet to the production supply outlet in the heating mode.

7. The switching flow apparatus of clause 6, further comprising:

a second heat exchanger control valve in fluid communication with said second heat exchanger outlet, wherein said second heat exchanger control valve is within said housing;

wherein said second heat exchanger control valve is configured to direct fluid from the second heat exchanger outlet to the production supply outlet in the cooling mode; and wherein said second heat exchanger control valve is configured to direct fluid from the second heat exchanger outlet to the source supply outlet in the heating mode.

8. The switching flow apparatus of any preceding clause, further comprising:

a first heat exchanger on/off valve in fluid communication with the first heat exchanger inlet, wherein said first heat exchanger on/off valve is within said housing;

wherein said first heat exchanger on/off valve is configured to be closed in the cooling mode so that the first heat exchanger inlet is in fluid communication with the source return inlet; and wherein said first heat exchanger on/off valve is configured to be open in the heating mode so that the first heat exchanger inlet is in fluid communication with the production return inlet.

9. The switching flow apparatus of clause 8, further comprising:

a second heat exchanger on/off valve in fluid communication with the second heat exchanger inlet, wherein said second heat exchanger on/off valve is within said housing;

wherein said second heat exchanger on/off valve is configured to be closed in the cooling mode so that the second heat exchanger inlet is in fluid communication with the production return inlet; and wherein said second heat exchanger on/off valve is configured to be open in the heating mode so that the second heat exchanger inlet is in fluid communication with the source return inlet.

10. The switching flow apparatus of any preceding clause, further comprising:

a control panel, wherein said control panel controls line voltage for the compressor.

11. The switching flow apparatus of any preceding clause, further comprising:

a domestic hot water supply line in fluid communication with said first heat exchanger outlet, wherein said domestic hot water supply line is configured to divert fluid from said first heat exchanger outlet to a hot water tank.

12. A switching flow source system comprising:

a switching flow apparatus including:

a refrigeration loop within a housing, wherein said refrigeration loop includes a compressor, a first heat exchanger, an expansion valve, and a second heat exchanger;

a source return inlet and a source supply outlet;

a production return inlet and a production supply outlet;

one or more valves in fluid communication with one or more of said source return inlet, said source supply outlet, said production return inlet, and said production supply outlet;

wherein said one or more valves are controllable to direct fluid from said source return inlet to either said first heat exchanger or to said second heat exchanger and direct fluid from said production return inlet to the other of said first heat exchanger and said second heat exchanger;

a source loop including a source return line in fluid communication with said source return inlet and including a source supply line in fluid communication with said source supply outlet;

a production loop including a production return line in fluid communication with said production return inlet and including a production supply line in fluid communication with said production supply outlet;

wherein in a cooling mode, said one or more valves are arranged so that said source loop is in fluid communication with said first heat exchanger and said production loop is in fluid communication with said second heat exchanger; and wherein in a heating mode, said one or more valves are arranged so that said source loop is in fluid communication with said second heat exchanger and said production loop is in fluid communication with said first heat exchanger.

13. The switching flow source system of clause 12, wherein said source loop is a hydronic geothermal loop.

14. The switching flow source system of clause 12 or 13, wherein said production loop is a hydronic HVAC loop.

15. The switching flow source system of any one of clauses 12-14, wherein said first heat exchanger is a condenser used for heat rejection in both the cooling mode and the heating mode.

16. The switching flow source system of any one of clauses 12-15, wherein said second heat exchanger is an evaporator used for heat absorption in both the cooling mode and the heating mode.

17. The switching flow source system of any one of clauses 12-16, wherein said production loop includes a solar thermal collector.

18. A method of switching a switching flow source system from a cooling mode to a heating mode, the method comprising:
   operating a heater chiller apparatus in a cooling mode, wherein said heater chiller apparatus comprises a housing and within said housing:
     a refrigeration loop, wherein said refrigeration loop includes a compressor, a first heat exchanger, an expansion valve, and a second heat exchanger;
     a source return inlet and a source supply outlet;
     a production return inlet and a production supply outlet;
     a first heat exchanger inlet and a first heat exchanger outlet;
     a second heat exchanger inlet and a second heat exchanger outlet;
     a first heat exchanger control valve and a first heat exchanger on/off valve;
     a second heat exchanger control valve and a second heat exchanger on/off valve;
     wherein in the cooling mode said first heat exchanger on/off valve is closed so that said source return inlet is in fluid communication with said first heat exchanger inlet and said source supply outlet is in fluid communication with said first heat exchanger outlet; and
     wherein in the cooling mode said second heat exchanger on/off valve is closed so that said production return inlet is in fluid communication with said second heat exchanger inlet and said production supply outlet is in fluid communication with said second heat exchanger outlet;
   opening said first heat exchanger on/off valve to an on position so that said production return inlet is diverted to be in fluid communication with said first heat exchanger inlet;
   opening said second heat exchanger on/off valve to an on position so that said source return inlet is diverted to be in fluid communication with said second heat exchanger inlet;
   placing said first heat exchanger control valve in a position so that said first heat exchanger outlet is in fluid communication with said production supply outlet; and
   placing said second heat exchanger control valve in a position so that said second heat exchanger outlet is in fluid communication with said source supply outlet.

19. The method of clause 18, wherein the opening of said first heat exchanger on/off valve and the opening of said second heat exchanger on/off valve is controlled by a control panel within said housing.

20. The method of clause 18 or 19, wherein in the cooling mode said first heat exchanger control valve is in a pass through position so that said first heat exchanger outlet is in fluid communication with said source supply outlet, and said second heat exchanger control valve is in a pass through position so that said second heat exchanger outlet is in fluid communication with said production supply outlet.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A switching flow apparatus comprising:
   a single housing;
   a refrigerant loop within said housing, wherein said refrigerant loop includes a compressor, a first heat exchanger, an expansion valve, and a second heat exchanger;
   a first heat exchanger inlet for fluid entering the first heat exchanger and a first heat exchanger outlet for fluid exiting the first heat exchanger;
   a second heat exchanger inlet for fluid entering the second heat exchanger and a second heat exchanger outlet for fluid exiting the second heat exchanger;
   a source return inlet configured to be in fluid communication with a source return line exterior to said housing, and a source supply outlet configured to be in fluid communication with a source supply line exterior to said housing;
   a single production return inlet configured to be in fluid communication with a production return line exterior to said housing, and a single production supply outlet configured to be in fluid communication with a production supply line exterior to said housing;
   wherein in a cooling mode, said source return inlet is in fluid communication with said first heat exchanger inlet and said source supply outlet is in fluid communication with said first heat exchanger outlet, and wherein said production return inlet is in fluid communication with said second heat exchanger inlet and said production supply outlet is in fluid communication with said second heat exchanger outlet; and
   wherein in a heating mode, said production return inlet is in fluid communication with said first heat exchanger inlet and said production supply outlet is in fluid communication with said first heat exchanger outlet, and wherein said source return inlet is in fluid communication with said second heat exchanger inlet and said source supply outlet is in fluid communication with said second heat exchanger outlet.

2. The switching flow apparatus of claim 1, wherein said first heat exchanger is used for heating the source fluid in the cooling mode and heating the production fluid in the heating mode.

3. The switching flow apparatus of claim 2, wherein said first heat exchanger is a condenser.

4. The switching flow apparatus of claim 1, wherein said second heat exchanger is used for cooling the production fluid in the cooling mode and cooling the source fluid in the heating mode.

5. The switching flow apparatus of claim 4, wherein said second heat exchanger is an evaporator.

6. The switching flow apparatus of claim 1, further comprising:
   a first heat exchanger control valve in fluid communication with said first heat exchanger outlet, wherein said first heat exchanger control valve is within said housing;

wherein said first heat exchanger control valve is configured to direct fluid from the first heat exchanger outlet to the source supply outlet in the cooling mode; and wherein said first heat exchanger control valve is configured to direct fluid from the first heat exchanger outlet to the production supply outlet in the heating mode.

7. The switching flow apparatus of claim 6, further comprising:

a second heat exchanger control valve in fluid communication with said second heat exchanger outlet, wherein said second heat exchanger control valve is within said housing;

wherein said second heat exchanger control valve is configured to direct fluid from the second heat exchanger outlet to the production supply outlet in the cooling mode; and wherein said second heat exchanger control valve is configured to direct fluid from the second heat exchanger outlet to the source supply outlet in the heating mode.

8. The switching flow apparatus of claim 1, further comprising:

a first heat exchanger on/off valve in fluid communication with the first heat exchanger inlet, wherein said first heat exchanger on/off valve is within said housing;

wherein said first heat exchanger on/off valve is configured to be closed in the cooling mode so that the first heat exchanger inlet is in fluid communication with the source return inlet; and wherein said first heat exchanger on/off valve is configured to be open in the heating mode so that the first heat exchanger inlet is in fluid communication with the production return inlet.

9. The switching flow apparatus of claim 8, further comprising:

a second heat exchanger on/off valve in fluid communication with the second heat exchanger inlet, wherein said second heat exchanger on/off valve is within said housing;

wherein said second heat exchanger on/off valve is configured to be closed in the cooling mode so that the second heat exchanger inlet is in fluid communication with the production return inlet; and wherein said second heat exchanger on/off valve is configured to be open in the heating mode so that the second heat exchanger inlet is in fluid communication with the source return inlet.

10. The switching flow apparatus of claim 1, further comprising:

a control panel, wherein said control panel controls line voltage for the compressor.

11. The switching flow apparatus of claim 1, further comprising:

a domestic hot water supply line in fluid communication with said first heat exchanger outlet, wherein said domestic hot water supply line is configured to divert fluid from said first heat exchanger outlet to a hot water tank.

12. The switching flow apparatus of claim 1, wherein said source return inlet, said source supply outlet, said source return line, and said source supply line form a source loop.

13. The switching flow apparatus of claim 12, wherein said source loop is a hydronic loop.

14. The switching flow apparatus of claim 12, wherein said production return inlet, said production supply outlet, said production return line, and said production supply line form a production loop.

15. The switching flow apparatus of claim 14, wherein said production loop is a hydronic loop.

16. The switching flow apparatus of claim 14, wherein in the cooling mode, said source loop is in fluid communication with said first heat exchanger and said production loop is in fluid communication with said second heat exchanger.

17. The switching flow apparatus of claim 16, wherein in the heating mode, said source loop is in fluid communication with said second heat exchanger and said production loop is in fluid communication with said first heat exchanger.

18. The switching flow apparatus of claim 1, further comprising:

a first heat exchanger bypass line in fluid communication with said source return inlet and in fluid communication with said second heat exchanger inlet.

19. The switching flow apparatus of claim 1, further comprising:

a second heat exchanger bypass line in fluid communication with said production return inlet and in fluid communication with said first exchanger inlet.

20. The switching flow apparatus of claim 1, further comprising:

a first heat exchanger outlet bypass flow line in fluid communication with said production supply outlet and in fluid communication with said first heat exchanger outlet.

* * * * *